United States Patent
Tordilla et al.

(10) Patent No.: US 11,985,044 B1
(45) Date of Patent: May 14, 2024

(54) SYSTEM AND METHODS FOR PROACTIVE NETWORK INFRASTRUCTURE COMPONENT MONITORING AND REPLACEMENT

(71) Applicant: BANK OF AMERICA CORPORATION, Charlotte, NC (US)

(72) Inventors: Don Tordilla, Glendale, CA (US); William R. Conrad, New Castle, DE (US); Charles L. Costello, Aberdeen, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/978,459

(22) Filed: Nov. 1, 2022

(51) Int. Cl.
- *G06F 15/173* (2006.01)
- *H04L 41/16* (2022.01)
- *H04L 43/045* (2022.01)

(52) U.S. Cl.
CPC ............ *H04L 41/16* (2013.01); *H04L 43/045* (2013.01)

(58) Field of Classification Search
CPC .............................. H04L 41/16; H04L 43/045
See application file for complete search history.

(56) References Cited

U.S. PATENT DOCUMENTS

| | | | |
|---|---|---|---|
| 6,058,260 A | 5/2000 | Brockel et al. | |
| 8,185,088 B2 | 5/2012 | Klein et al. | |
| 8,589,541 B2 | 11/2013 | Raleigh et al. | |
| 9,191,380 B2 | 11/2015 | Anderson et al. | |
| 9,660,868 B2 | 5/2017 | Mishra et al. | |
| 9,922,345 B2 | 3/2018 | Mikurak | |
| 10,101,734 B2 | 10/2018 | Cooper et al. | |
| 10,129,777 B2 | 11/2018 | Austin et al. | |
| 10,235,445 B2 | 3/2019 | Quadracci et al. | |
| 10,595,175 B2 | 3/2020 | Ramalho De Oliveira | |
| 11,074,061 B2 | 7/2021 | Franchitti | |
| 11,082,244 B2 | 8/2021 | McNamee et al. | |
| 11,477,246 B2 | 10/2022 | Raleigh et al. | |
| 2010/0274367 A1 | 10/2010 | Kaufman et al. | |
| 2018/0376306 A1 | 12/2018 | Ramalho De Oliveira | |
| 2019/0057335 A1* | 2/2019 | Dyer ................ | G06Q 10/06311 |
| 2019/0205115 A1 | 7/2019 | Gomes | |
| 2019/0265971 A1 | 8/2019 | Behzadi et al. | |
| 2021/0248693 A1 | 8/2021 | Riland et al. | |

(Continued)

*Primary Examiner* — Padma Mundur
(74) *Attorney, Agent, or Firm* — Moore & Van Allen PLLC; Nicholas C. Russell

(57) ABSTRACT

Systems, computer program products, and methods are described herein for proactive network infrastructure component monitoring and replacement. The present invention is configured to transmitting instructions to display a manager input portal via a graphical display of a user device; receiving input via the graphical display of the user device for one or more network components or constraint variables; initiating a logic algorithm to determine the effects of the one or more network components or constraint variables on an assignment list; generating an updated assignment list and analyze the updated assignment list in comparison with one or more prior versions to determine one or more changes; generating a link between the one or more changes and the received input; and using a machine learning algorithm, forecasting one or more additional changes in order to generate an optimized recommendation for the updated assignment list.

17 Claims, 6 Drawing Sheets

(56) References Cited

U.S. PATENT DOCUMENTS

| 2022/0083046 | A1   | 3/2022 | Cella et al. |              |
|--------------|------|--------|--------------|--------------|
| 2022/0197625 | A1 * | 6/2022 | Franchitti   |              |
| 2023/0065444 | A1 * | 3/2023 | Pyla         | H04L 41/0896 |
| 2023/0176918 | A1 * | 6/2023 | Aronovich    | G06N 20/00   |
|              |      |        |              | 718/103      |

* cited by examiner

SYSTEM AND METHODS FOR PROACTIVE NETWORK INFRASTRUCTURE COMPONENT MONITORING AND REPLACEMENT

FIELD OF THE INVENTION

The present invention embraces a system and method for proactive network infrastructure component monitoring and replacement.

BACKGROUND

Conventional network topology component upgrade solutions currently require complex logistics in terms of managing equipment lifespan, cost, and component supply chain availability. There is a need for an automated solution that accounts for all of these factors and can dynamically provide recommendations for network component upgrade planning based on a number of user-configurable variables.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

While conventional network topology component upgrade solutions currently require complex logistics in terms of managing equipment lifespan, cost, and component supply chain availability, there is an opportunity to develop an intelligent solution which can dynamically provide recommendations for network component upgrade planning based on a number of user-configurable variables. For instance, an entity managing a large network infrastructure may be required to replace or upgrade certain equipment on a rolling-basis in order to adhere to strict budgetary guidelines and cash flow availability. In addition, network component upgrades also present challenges in terms of cross compatibility between devices, failure rates, known vulnerabilities, complexity of installation, available change windows, and supply chain availability in terms of when new network components can be ordered from certain suppliers or distributers. An ideal solution would analyze these and other variables when providing an automated recommendation for when and how to upgrade or replace one or more network components in an entity's network infrastructure. The present invention addresses these needs by providing an intelligent, dynamic, and interactive solution which allows one or more users to user modify one or more variables and visualize overall effect on network topology upgrade planning implementation. For instance, a user may use the present invention to forecast how changes in budget would affect a network infrastructure in terms of when and how certain network components could be upgraded, how the expected failure rate of the overall network or portions of the network could be improved, and what to expect in terms of how quickly network components could be replaced given the necessary time it takes to install each component in light of available change window availability. For instance, even if budget was increased to infinity, available change windows may constrain the ability for network engineers to replace or upgrade certain network components, and therefore there may be an optimal budgetary goal which would allow for a maximum decrease in failure rate of network components across the network infrastructure within the bounds of what is possible to be implemented given the available change windows of the entity's network. It is understood that changing one variable alone, such as available budget, may also cause other variables in the analysis to change as well. As such, the present invention requires a wholistic approach to accounting for multiple variables at once, which can be cumbersome or even impossible for a human to do alone without the help of a novel automated solution.

Network inventory data is typically drawn from multiple sources and maintained in the refresh database (RDB) which tracks the network components that may require updating, and may also include information as to the cost, change-window requirements, or the like, associated with each network component. Lifecycle management network technologies (LMNT) for a given entity may have an annual planning cycle which starts mid-year and is brought for approval toward the end of the fiscal year. RDB is utilized by various entity teams to develop a device replacement/decommission plan that may be forward-looking for around three years or so. Domain teams prioritize by reviewing Non-Permitted Technology (NPT) designation, failure chance, net technology strategy, site closures, and capacity to perform change given available personnel and budgetary constraints. Once a plan is approved by an entity, new hardware is purchased and installed, while old hardware is decommissioned. RDB is updated periodically with current data and tracks and reports on progress of various component updates. The present invention assists in automating the updating of the RDB and adds functionality in that it can provide intelligent forecast recommendations for technology updates based on constraint inputs. It is understood that the RDB includes tracking information on all deployed network configuration management database (CMDB) components. Every component has a projected remediation plan, which may include replacement product or decommission plans, date of purchase/install, or cost of refresh (i.e., capital, labor, and expense requirements). The RDB serves as the artifact for the network's end of life projections, current state conditions, as well as future state forecasts. The RDB may also reconcile forecasted refresh spend numbers with actual results in hindsight, which may allow the system to extrapolate trends from historical data in order to optimize forward looking recommendations via the use of a specific machine learning algorithm. Typically, each domain team within the entity network may have the authority to adjust remediation plans (i.e., dates, costs, preferred products, or the like) to reflect what is desirable and achievable, thus the model is required to account for changes in variables and preferences across a number of different teams to ensure a synergistic approach that best utilizes available resources.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: transmit instructions to display a manager input portal via a graphical display of a user device; receive input via the graphical display of the user device for one or more network components or constraint variables; initiate a logic algorithm to determine the effects of the one or more network components or constraint variables on an assignment list; generate an updated assignment list and analyze the updated assignment list in comparison with one or more prior versions to determine one or more changes; generate a link between the one or more changes and the received input; and using a machine learning algorithm, forecast one or more additional changes in order to generate an optimized recommendation for the updated assignment list.

In some embodiments, the at least one processor is further configured to transmit a message via the graphical display of the user device indicating the optimized recommendation for the updated assignment list.

In some embodiments, updated assignment list further comprises an option to accept or reject one or more subcomponents of the assignment list.

In some embodiments, the manager input portal further comprises one or more interactive modules designed for graphically inputting dynamic constraint variables.

In some embodiments, the interactive modules further comprise one or more drop-down menus or sliding scales.

In some embodiments, the logic algorithm further comprises checking each of the network components or constraint variables against one or more other inputs to determine if they are true or false.

In some embodiments, the updated assignment list contains one or more inputs that can be integrated with an existing network component inventory list.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
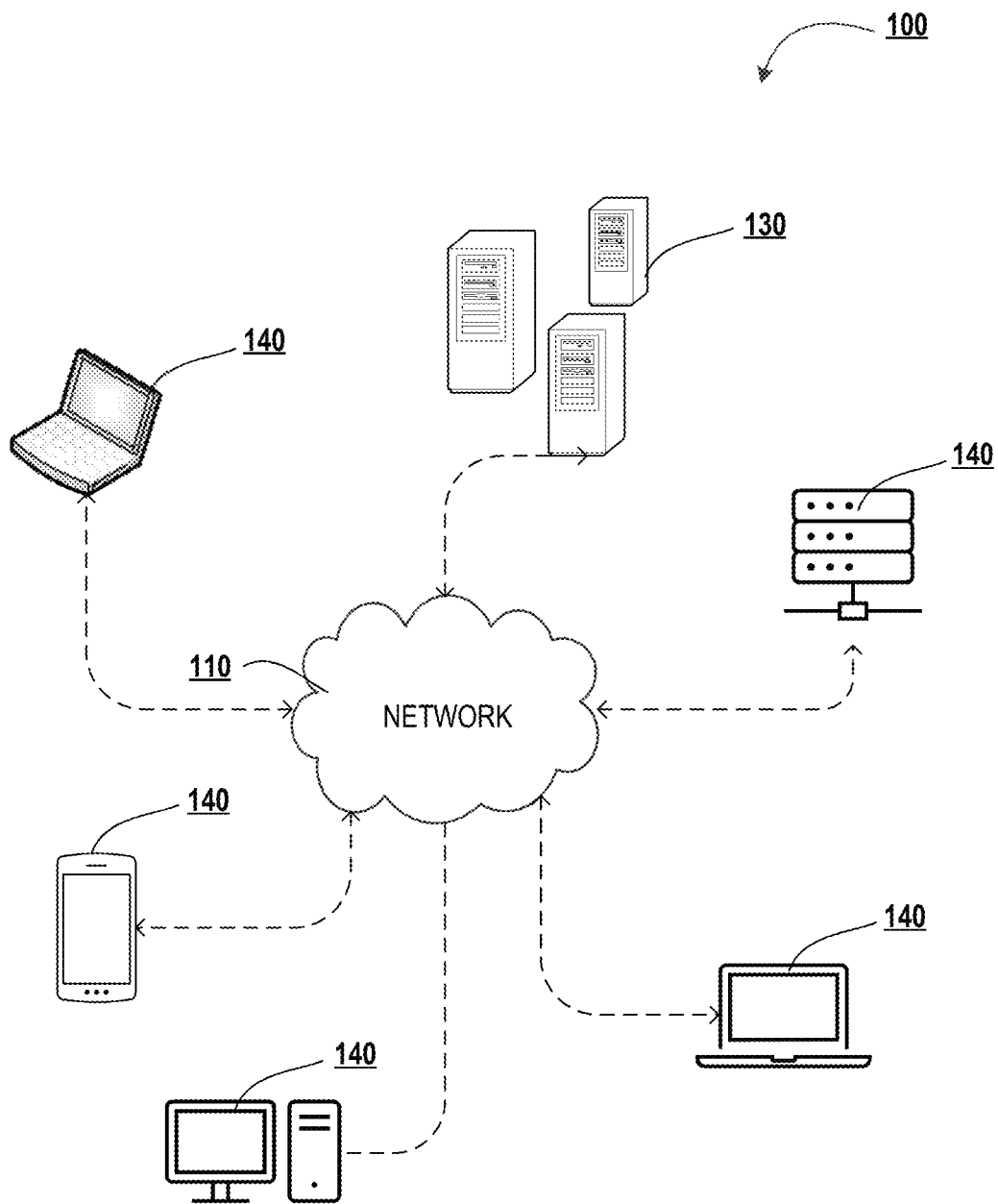
Figure 1B:
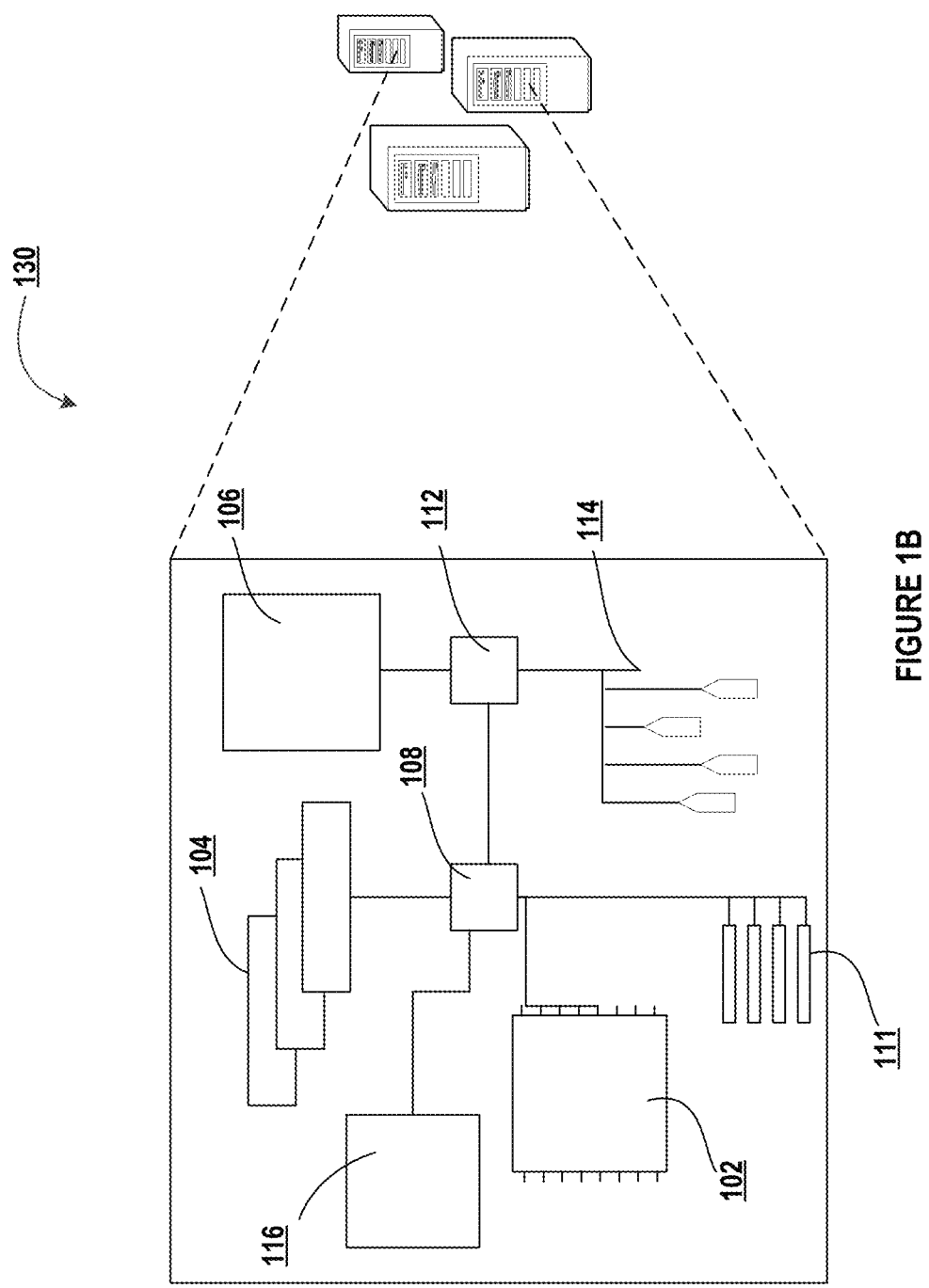
Figure 1C:
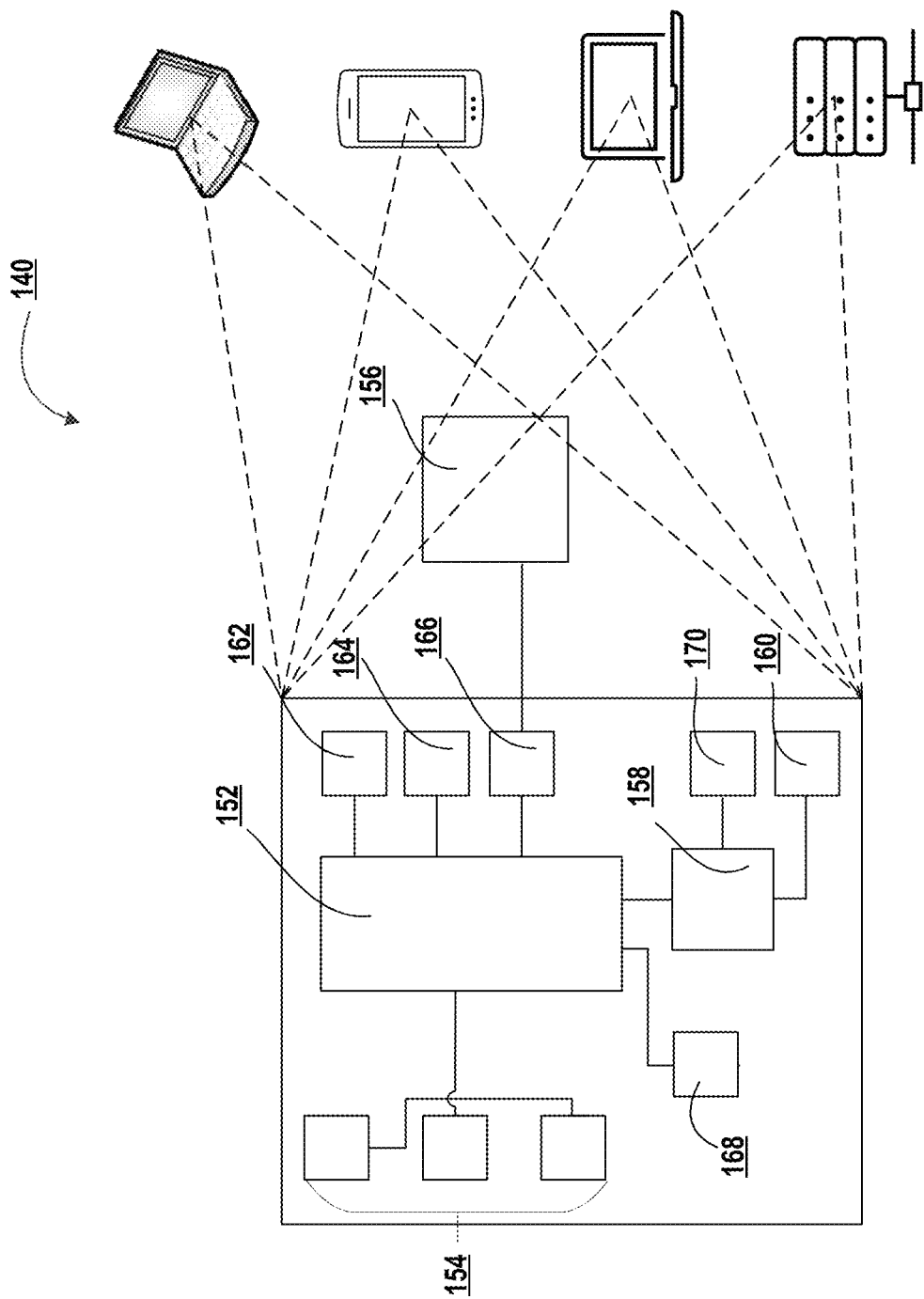
Figure 2:
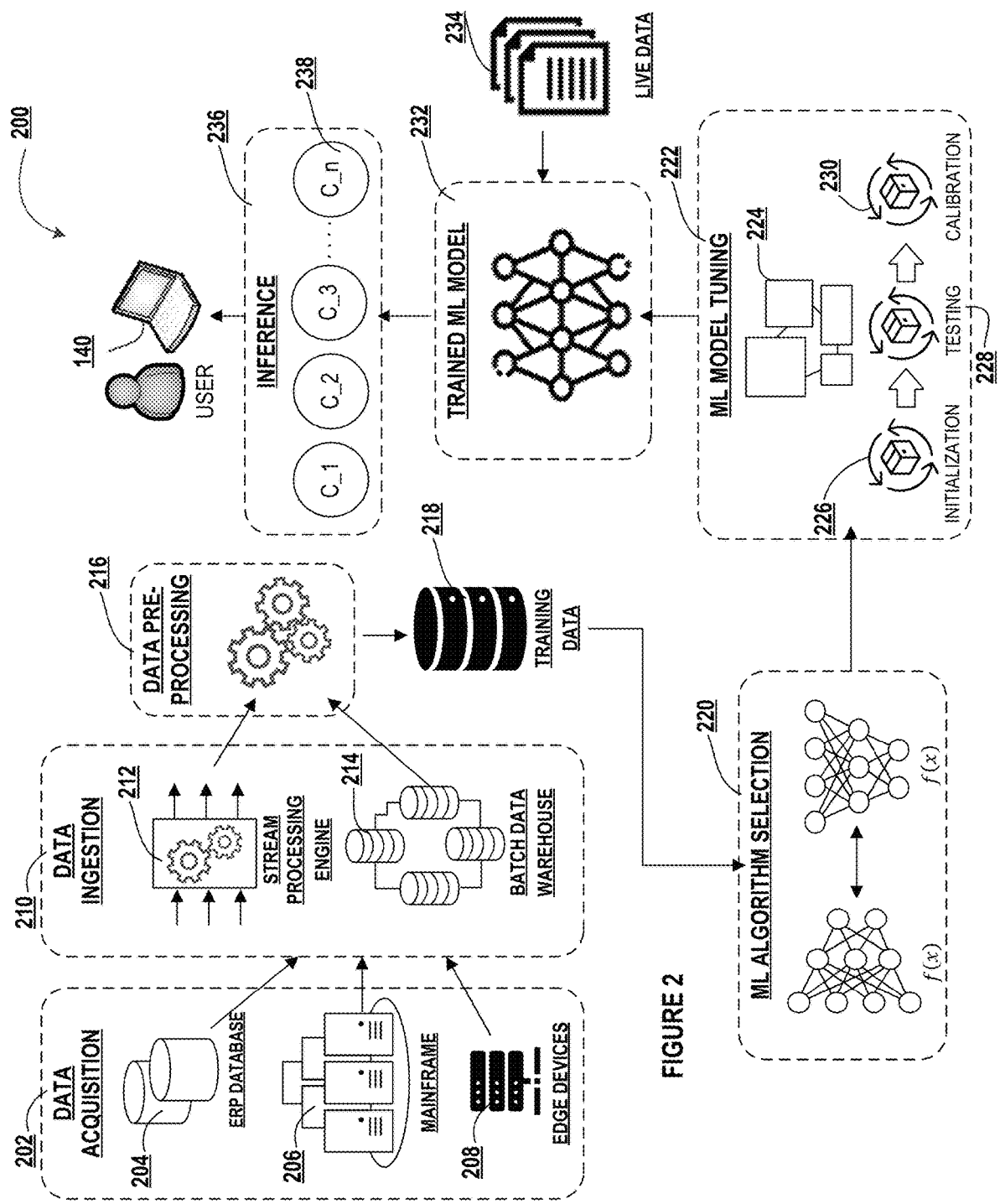
Figure 3:
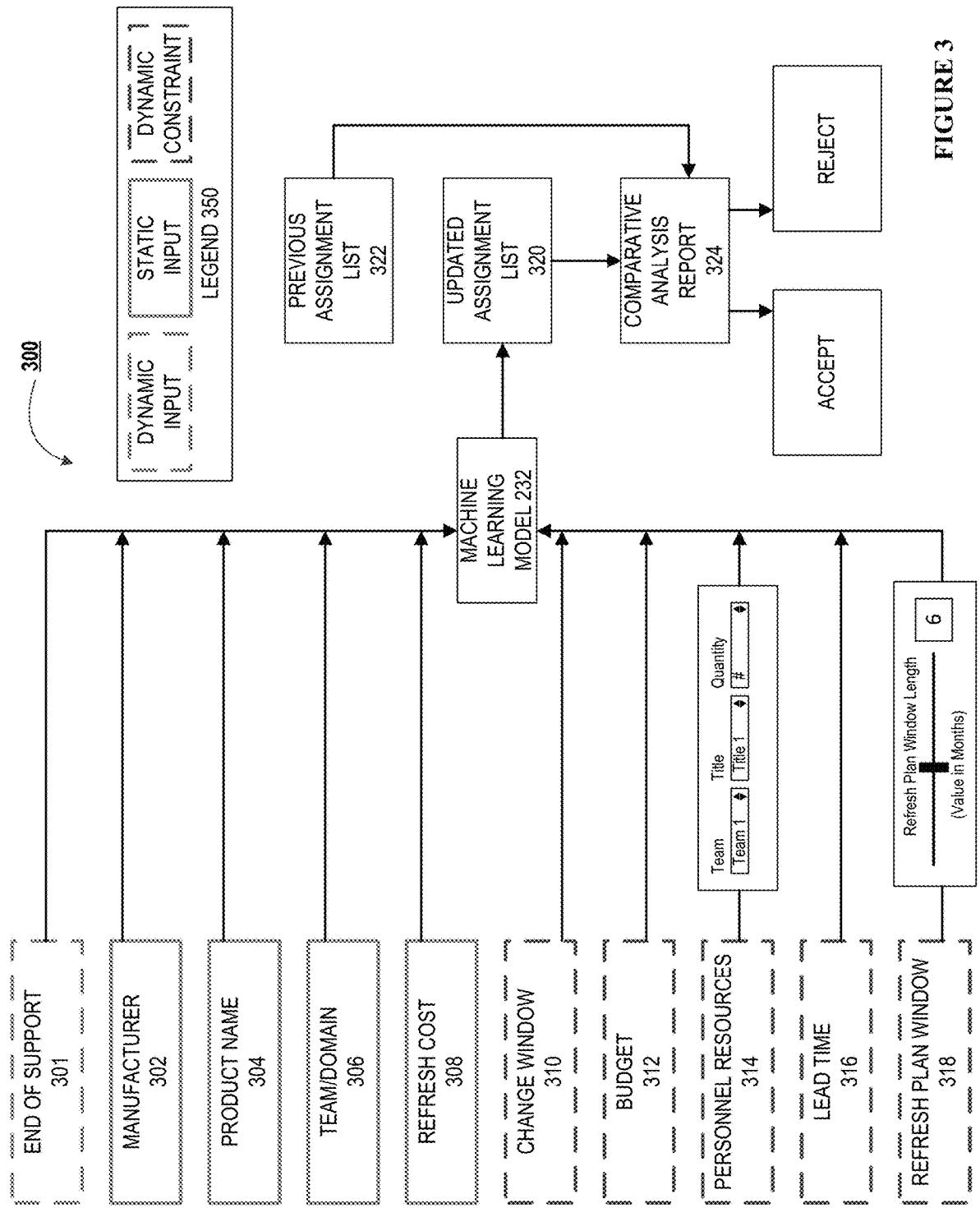
Figure 4:
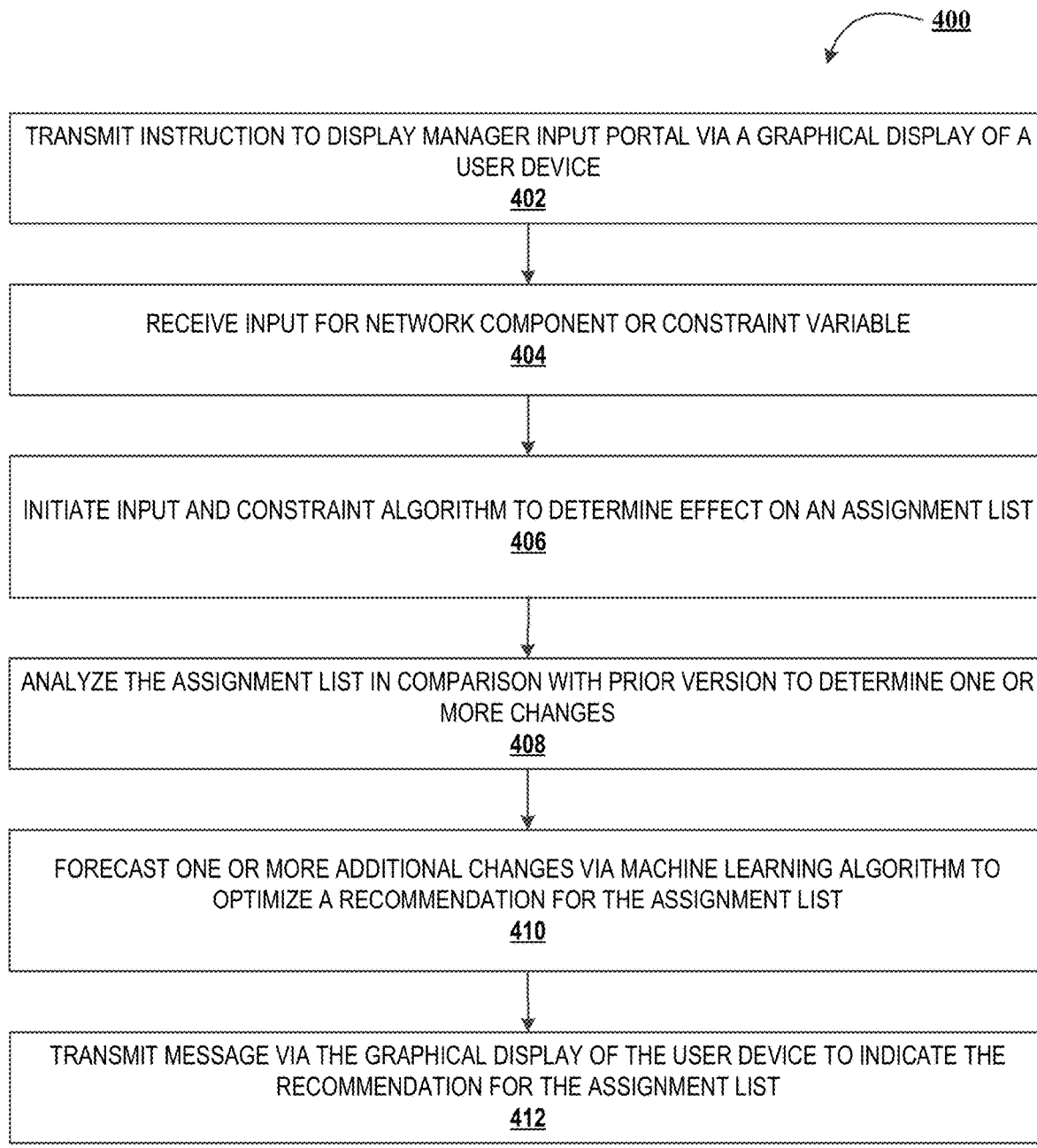

Having thus described embodiments of the invention in general terms, reference will now be made the accompanying drawings, wherein:

FIGS. 1A-1C illustrates technical components of an exemplary distributed computing environment for proactive network infrastructure component monitoring and replacement in accordance with an embodiment of the invention;

FIG. 2 illustrates an exemplary machine learning (ML) subsystem architecture 200 which facilitates proactive network infrastructure component monitoring and replacement, in accordance with an embodiment of the invention;

FIG. 3 illustrates a high-level process flow for model input, in accordance with an embodiment of the invention; and FIG. 4 illustrates a process flow for proactive network infrastructure component monitoring and replacement, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by an entity, including property that is stored and/or maintained by a third-party entity. In some example implementations, a resource may be associated with one or more computing capacities. Examples of resources associated with computing capacities may processing power, network bandwidth, personnel availability, budgetary constraints, or the like.

While conventional network topology component upgrade solutions currently require complex logistics in terms of managing equipment lifespan, cost, and component supply chain availability, there is an opportunity to develop an intelligent solution which can dynamically provide recommendations for network component upgrade planning based on a number of user-configurable variables. For instance, an entity managing a large network infrastructure may be required to replace or upgrade certain equipment on a rolling-basis in order to adhere to strict budgetary guidelines and cash flow availability. In addition, network component upgrades also present challenges in terms of cross compatibility between devices, failure rates, known vulnerabilities, complexity of installation, available change windows, and supply chain availability in terms of when new network components can be ordered from certain suppliers or distributers. An ideal solution would analyze these and other variables when providing an automated recommendation for when and how to upgrade or replace one or more network components in an entity's network infrastructure. The present invention addresses these needs by providing an intelligent, dynamic, and interactive solution which allows one or more users to user modify one or more variables and visualize overall effect on network topology upgrade planning implementation. For instance, a user may use the present invention to forecast how changes in budget would affect a network infrastructure in terms of when and how certain network components could be upgraded, how the expected failure rate of the overall network or portions of the network could be improved, and what to expect in terms of how quickly network components could be replaced given the necessary time it takes to install each component in light of available change window availability. For instance, even if budget was increased to infinity, available change windows may constrain the ability for network engineers to replace or upgrade certain network components, and therefore there may be an optimal budgetary goal which would allow for a maximum decrease in failure rate of network components across the network infrastructure within the bounds of what is possible to be implemented given the available change windows of the entity's network. It is understood that changing one variable alone, such as available budget, may also cause other variables in the analysis to change as well. As such, the present invention requires a wholistic approach to accounting for multiple variables at once, which can be cumbersome or even impossible for a human to do alone without the help of a novel automated solution.

Network inventory data is typically drawn from multiple sources and maintained in the refresh database (RDB) which tracks the network components that may require updating, and may also include information as to the cost, change-window requirements, or the like, associated with each network component. Lifecycle management network technologies (LMNT) for a given entity may have an annual planning cycle which starts mid-year and is brought for approval toward the end of the fiscal year. RDB is utilized by various entity teams to develop a device replacement/decommission plan that may be forward-looking for around three years or so. Domain teams prioritize by reviewing Non-Permitted Technology (NPT) designation, failure chance, net technology strategy, site closures, and capacity to perform change given available personnel and budgetary constraints. Once a plan is approved by an entity, new hardware is purchased and installed, while old hardware is decommissioned. RDB is updated periodically with current data and tracks and reports on progress of various component updates. The present invention assists in automating the updating of the RDB and adds functionality in that it can provide intelligent forecast recommendations for technology updates based on constraint inputs. It is understood that the RDB includes tracking information on all deployed network configuration management database (CMDB) components. Every component has a projected remediation plan, which may include replacement product or decommission plans, date of purchase/install, or cost of refresh (i.e., capital, labor, and expense requirements). The RDB serves as the artifact for the network's end of life projections, current state conditions, as well as future state forecasts. The RDB may also reconcile forecasted refresh spend numbers with actual results in hindsight, which may allow the system to extrapolate trends from historical data in order to optimize forward looking recommendations via the use of a specific machine learning algorithm. Typically, each domain team within the entity network may have the authority to adjust remediation plans (i.e., dates, costs, preferred products, or the like) to reflect what is desirable and achievable, thus the model is required to account for changes in variables and preferences across a number of different teams to ensure a synergistic approach that best utilizes available resources.

FIGS. 1A-1C illustrate technical components of an exemplary distributed computing environment for proactive network infrastructure component monitoring and replacement 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a high-level process flow for model input, in accordance with an embodiment of the invention. As indicated in FIG. 3, there are three general types of inputs to the machine learning model 232 that can be classified according to legend 350 as dynamic inputs, static inputs, or dynamic constraints. Dynamic inputs may include end of support 301, which indicates when a product is no longer supported by the entity, by the manufacturer of the product, or by nature of hardware or software limitations that create an incompatibility with version updates or other network components integrated in the network topology of the entity. Static inputs may include factors such as product manufacturer 302, product name 304, team or domain 306 (i.e., team of employees or users responsible for maintaining or implementing the network components, or the like), and refresh cost 308. These inputs remain relatively unchanged during the course of analyzing upgrade and implementations recommendations. For instance, a given manufacturer, product name, team responsible for installing or maintaining the product, and cost of the product typically remain somewhat static over a year-long timeframe. It is understood that refresh costs 308 may change when a particular product ages, and this input variable can be updated. However, in terms of conducting an analysis for upgrade or replacement recommendations, this variable typically will not change due to slight variances in dynamic constraint variables and is thus referred to as a static input in this context.

Also shown in FIG. 3 is a number of dynamic constraint variables, such as change window 310, budget 312, personnel resources 314, lead time 316, and refresh plan window 318. Indicated next to personnel resources 314 is an example of a drop-down menu that may be integrated in the graphical user interface of a user device via the management portal used to input information and receive responsive recommendation feedback or analysis results from the platform. For instance, in terms of personnel resources 314, a drop-down menu may include items such as a team identifier, or "Team 1," a job title, or "Title 1," and a quantity input value for the number of team members required to complete a given refresh for a specific product.

Further shown in FIG. 3 is a sliding scale to the right of refresh plan window 318, which provides an exemplary embodiment of a graphical user interface input method for adjusting the dynamic constraint of refresh plan window 318. As shown in FIG. 3, the sliding scale can be adjusted by the user via the management input portal to indicate a specific timeframe for which the machine learning model 232 or platform algorithm should take into account when analyzing or evaluating how each of the inputs affects an updated assignment list 320. It is understood that the updated assignment list may be iteratively compared back to one or more previous assignment list(s) 322 in order to generate a comparative analysis report 324, which the users of the system may either accept or reject based on the determined outcome.

FIG. 4 illustrates a process flow for proactive network infrastructure component monitoring and replacement, in accordance with an embodiment of the invention. As shown in block 402, the process begins whereby the system may transmit instructions to display a manager input portal via a graphical display of a user device. As discussed with regard to FIG. 3, the manager input portal may contain one or more interactive input tools such as drop down boxes or sliding scales in order to adjust dynamic constraints with respect to a particular network component refresh. Next, the process continues by receiving input for one or more network components or constraint variables, as shown in block 404. These may include dynamic inputs, static inputs, or dynamic constraints, as noted in FIG. 3. Next, the process initiates an input and constraint algorithm in order to determine the effect of each variable input on an assignment list, as shown in block 406. For instance, the algorithm may begin with determining if the requested change window is feasible given the other inputs and will update the assignment list with any changes that reflect limitations. Next, the algorithm may analyze the budget input variable, the personnel resource variable, the lead time variable, the refresh plan window variable, and confirm each of these inputs as logically confirming with other inputs before moving to the next input or constraint. If a given input or constraint does not agree with another input or constraint, the algorithm may adjust the input or indicate which range of inputs for that specific variable would conform with other input variables for which the variable being analyzed does not agree. In this way, the system may generate an updated assignment list 320.

The process proceeds by analyzing the updated assignment list in comparison with prior versions to determine one or more changes to the assignment list in light of variances in the input variables, as shown in block 408. In this way, the system may forecast one or more additional changes via the machine learning algorithm 232 in order to provide an optimization recommendation for the assignment list. Finally, the system may transmit a message via the graphical display of the user device in order to indicate the recommendation for the assignment list. This may include showing the full assignment list, which comprises device information, order date(s), install date(s), change window information (i.e., specific date ranges), required personnel resources, and budgetary impact(s). The user of the system may either accept or deny the changes in order to cause the system to readjust the dynamic constraints and provide alternate assignment lists that may be satisfactory. For instance, the user may reject the recommendation for the assignment list and indicate that the budgetary impact is unacceptable. The user may adjust a sliding scale to indicate a budget limitation, and the system may adjust each of the dynamic constraints in series in order to determine if minor variances in dynamic constraints such as change window, personnel requirements, or the like, would allow the same products to be implemented over a longer window using less personnel resources, for instance.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for proactive network infrastructure component monitoring and replacement, the system comprising:
   at least one non-transitory storage device; and
   at least one processor coupled to the at least one non-transitory storage device, wherein the at least one processor is configured to:
   transmit instructions to display a manager input portal via a graphical display of a user device;
   determine one or more constraint variables from an assignment list, wherein the assignment list comprises device information, component order date, component install date, and required personnel resources;
   receive an adjustment input via the manager input portal, wherein the manager input portal further comprises a sliding scale for graphically adjusting the one or more constraint variables;
   generate an updated assignment list based on the adjustment input and analyze the updated assignment list in comparison with one or more prior versions to determine one or more changes; and
   based on the one or more changes, transmit a message via the graphical display of the user device indicating projections for an updated component order date, an updated component install date, or an updated amount of required personnel resources.

2. The system of claim 1, wherein the at least one processor is further configured to transmit a message via the graphical display of the user device indicating an optimized recommendation for the updated assignment list.

3. The system of claim 1, wherein the updated assignment list further comprises an option to accept or reject one or more sub-components of the assignment list.

4. The system of claim 1, wherein the manager input portal further comprises one or more interactive modules designed for graphically inputting dynamic constraint variables.

5. The system of claim 4, wherein the interactive modules further comprise one or more drop-down menus or sliding scales.

6. The system of claim 1, wherein the updated assignment list contains one or more inputs that can be integrated with an existing network component inventory list.

7. A computer program product for proactive network infrastructure component monitoring and replacement, the computer program product comprising a non-transitory computer-readable medium comprising code causing an apparatus to:

transmit instructions to display a manager input portal via a graphical display of a user device;

determine one or more constraint variables from an assignment list, wherein the assignment list comprises device information, component order date, component install date, and required personnel resources;

receive an adjustment input via the manager input portal, wherein the manager input portal further comprises a sliding scale for graphically adjusting the one or more constraint variables;

generate an updated assignment list based on the adjustment input and analyze the updated assignment list in comparison with one or more prior versions to determine one or more changes; and based on the one or more changes, transmit a message via the graphical display of the user device indicating projections for an updated component order date, an updated component install date, or an updated amount of required personnel resources.

8. The computer program product of claim 7, wherein the apparatus is further configured to transmit a message via the graphical display of the user device indicating an optimized recommendation for the updated assignment list.

9. The computer program product of claim 7, wherein the updated assignment list further comprises an option to accept or reject one or more sub-components of the assignment list.

10. The computer program product of claim 7, wherein the manager input portal further comprises one or more interactive modules designed for graphically inputting dynamic constraint variables.

11. The computer program product of claim 10, wherein the interactive modules further comprise one or more drop-down menus or sliding scales.

12. The computer program product of claim 7, wherein the updated assignment list contains one or more inputs that can be integrated with an existing network component inventory list.

13. A method for proactive network infrastructure component monitoring and replacement, the method comprising:

transmitting instructions to display a manager input portal via a graphical display of a user device;

determining one or more constraint variables from an assignment list, wherein the assignment list comprises device information, component order date, component install date, and required personnel resources;

receiving an adjustment input via the manager input portal, wherein the manager input portal further comprises a sliding scale for graphically adjusting the one or more constraint variables;

generating an updated assignment list based on the adjustment input and analyze the updated assignment list in comparison with one or more prior versions to determine one or more changes; and based on the one or more changes, transmitting a message via the graphical display of the user device indicating projections for an updated component order date, an updated component install date, or an updated amount of required personnel resources.

14. The method of claim 13, wherein the method further comprises: transmitting a message via the graphical display of the user device indicating an optimized recommendation for the updated assignment list.

15. The method of claim 13, wherein the updated assignment list further comprises an option to accept or reject one or more sub-components of the assignment list.

16. The method of claim 13, wherein the manager input portal further comprises one or more interactive modules designed for graphically inputting dynamic constraint variables.

17. The computer program product of claim 16, wherein the interactive modules further comprise one or more drop-down menus or sliding scales.

\* \* \* \* \*